United States Patent [19]

Bernar et al.

[11] Patent Number: 5,718,349
[45] Date of Patent: Feb. 17, 1998

[54] STOPPER FOR RACKING-OFF OPERATIONS

[75] Inventors: Bernardino Bernar, Padua; Pietro Bassan, Latisana, both of Italy

[73] Assignee: BBS S.r.l., Venice, Italy

[21] Appl. No.: 555,692

[22] Filed: Nov. 14, 1995

[30] Foreign Application Priority Data

Nov. 23, 1994 [IT] Italy ................. PD94A0203

[51] Int. Cl.⁶ ................. B01D 21/00; B65D 39/04; C12G 1/08; C12H 1/02
[52] U.S. Cl. ................. 215/355; 99/277.1; 210/803; 426/495
[58] Field of Search ................. 215/355, 364, 215/228, 258, 299; 210/800, 803; 426/8, 495, 112, 115, 592; 99/277.1, 277.2, 276

[56] References Cited

U.S. PATENT DOCUMENTS

| | | | |
|---|---|---|---|
| 485,248 | 11/1892 | Walfard | 426/495 |
| 1,419,580 | 6/1922 | Molinari | 215/355 X |
| 4,687,115 | 8/1987 | Bongiovanni | 215/355 |
| 4,779,764 | 10/1988 | Debetencourt | 215/250 X |
| 4,947,737 | 8/1990 | Gladstone | 99/277.1 |

FOREIGN PATENT DOCUMENTS 1488476   6/1967   France ................. 215/355

*Primary Examiner*—Allan N. Shoap
*Assistant Examiner*—Niki M. Kopsidas
*Attorney, Agent, or Firm*—Guido Modiano; Albert Josif

[57] ABSTRACT

A stopper for racking-off operations that comprises a body which is substantially mushroom-shaped, is made of plastics, and is constituted by a tubular cylindrical element adapted to enter the neck of a bottle and close it, and by a head having a larger diameter than the cylindrical element and being monolithic therewith. The stopper for racking-off operations furthermore comprises a container that extends substantially from the head in the opposite direction with respect to the cylindrical element, the container having an opening, at the head, that is connected to a duct passing therethrough and in turn also connected to the internal cavity of the cylindrical element and therefore, when installed, to the inside of the bottle.

9 Claims, 1 Drawing Sheet

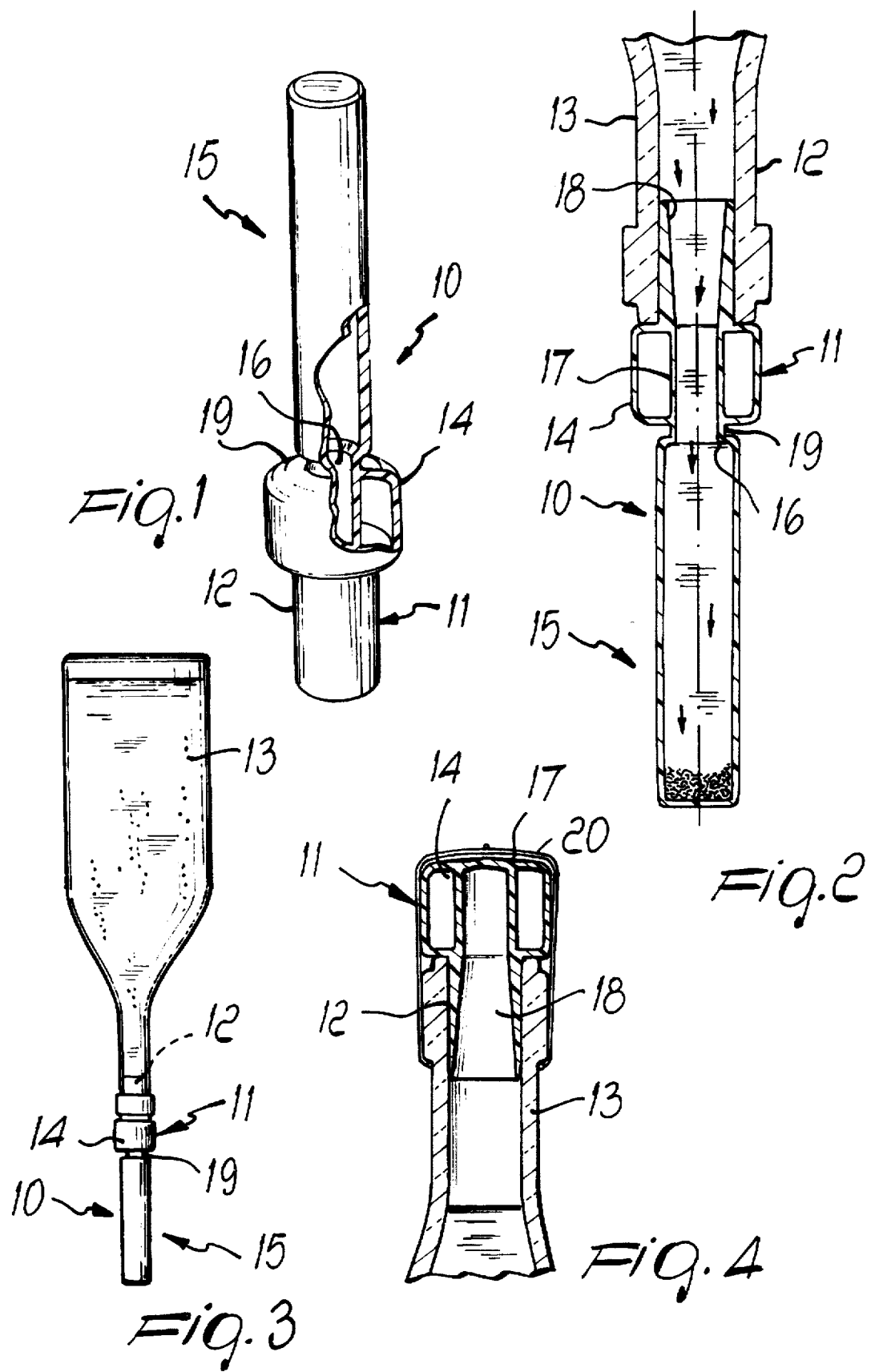

STOPPER FOR RACKING-OFF OPERATIONS

BACKGROUND OF THE INVENTION

The present invention relates to a stopper for racking-off operations.

It is known that in the case of quality wines, such as for example sparkling wines, it is necessary to perform the so-called "spilling out" operation.

The spill-out operation seeks to eliminate the sediments that have formed in the wine during fermentation and maturation; these sediments are known as lees.

Lees elimination, which is required for many wine-making methods for which said lees are also aesthetically unacceptable, currently occurs carrying out a process that is now commonly used.

Said methods entail keeping the bottles upside down to make the lees deposit.

The racking-off process then entails placing each bottle, still upside down, in a refrigerating machine, which produces in practice an ice plug by cooling to a low temperature a region of the bottle that substantially corresponds to the neck.

The lees, which have deposited beforehand by gravity, once the ice plug has formed, and once the bottle has been uncorked, are expelled from said bottle almost automatically, due to the pressure of the gases present inside the bottle.

Although the ice plug avoids the escape of the wine, which moreover, as mentioned, is usually under pressure (commonly 3 to 10 atmospheres), it cannot avoid a certain loss, which must be compensated by means of a replenishment operation to be performed before the bottle is corked again.

The process, despite having by now been tested extensively, is particularly complicated and requires the above-mentioned replenishment.

In particular, uncorking and corking the bottle again causes a considerable waste of time, and it is furthermore necessary to provide for the presence of reservoirs for the replenishing wine.

SUMMARY OF THE INVENTION

A principal aim of the present invention is to provide a stopper for racking-off operations that solves the drawbacks entailed by current spill-out devices and methods.

Accordingly, an object of the present invention is to provide a stopper that allows a racking-off operation that does not require wine replenishment.

Another object of the present invention is to provide a stopper that allows racking-off without uncorking the bottle.

Another object of the present invention is to provide a stopper wherein the bottle is efficiently closed again, after racking-off, so as to contain the considerable pressures that might form inside it.

Another object of the present invention is to provide a stopper the cost whereof is competitive with currently commercially available stoppers.

Another object of the present invention is to provide a stopper that can also be used in bottles for quality wines.

This aim, these objects, and others which will become apparent hereinafter are achieved by a stopper that comprises a body which is substantially mushroom-shaped, is made of plastics, and is constituted by a tubular cylindrical element adapted to enter the neck of a bottle and close it, and by a head having a larger diameter than said cylindrical element and being monolithic therewith, said stopper being characterized in that it comprises a container extending substantially from said head in the opposite direction with respect to said cylindrical element, said container having an opening, at said head, that is connected to a duct that passes therethrough and is in turn also connected to the internal cavity of said cylindrical element and therefore, when installed, to the inside of the bottle.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein:

FIG. 1 is an axonometric view of a stopper according to the invention;

FIG. 2 is a sectional view, taken along a diametrical plane, of the stopper according to the invention, when installed;

FIG. 3 is a side view of the stopper according to the invention, when installed;

FIG. 4 is a diametrical sectional view of the stopper according to the invention after the spill-out operation has been completed.

DESCRIPTION OF THE PREFERRED EMBODIMENTS

With particular reference to FIGS. 1 to 4, a stopper according to the invention is generally designated by the reference numeral 10.

The stopper 10, which in this case is made of plastics, comprises a body 11 substantially mushroom-shaped and constituted by a tubular cylindrical element 12, which is externally smooth in this case but can also be ribbed, and is adapted to enter the neck of a bottle 13 and close it, and by a head 14, the diameter whereof is greater than that of the cylindrical element 12 and is monolithic therewith.

The stopper 10 furthermore comprises a container 15, which is substantially cylindrical in this case and extends monolithically from the head 14 in the opposite direction with respect to the cylindrical element 12.

The container 15 has an opening 16 at the head 14 that is connected to a through duct 17 formed therein and also connected, in turn, to the internal cavity 18 of the cylindrical element 12 and thus, when installed, to the inside of the bottle 13. As seen in FIG. 2, the container 15 includes a wall portion which delimits an inside of the container 15 at the bottom of which sediment or lees may settle as will be described hereinafter, and the wall portion of the container 15 is free of any protruding portions protruding from the wall portion into the inside of the container 15 and into the through duct 17.

In particular, the container 15 has, at the coupling to the head 14, a tapered region so as to form a neck 19.

The internal surface that forms the cavity 18 is furthermore tapered at least proximate to the head 14.

In practice, operation is as follows: spill-out is performed when the bottle 13 is already upside down, and therefore the lees, by gravity, have already descended through the cavity 18, the duct 17, and the opening 16, into the container 15 to deposit on its bottom.

Once the complete deposition of the lees has been checked, the neck 19 is heat-sealed and cut.

This cutting and heat-sealing operation, however, must occur after freezing a portion corresponding to the neck of the bottle 13, thus preventing the wine from flowing out.

In this operation, since the bottle actually is never substantially open because cutting is followed immediately by heat-sealing (or vice versa), replenishment is absolutely unnecessary.

Furthermore, in order to conceal from sight the heat-sealed part, which is usually aesthetically unsightly, it is possible to provide a metallic covering 20 or a covering of another type, arranged above the head 14, these coverings being of the type normally used.

In practice it has been observed that the present invention has achieved the intended aim and objects.

In particular, it should be mentioned first of all that racking-off occurs by performing a plurality of operations that never entail uncorking the bottle.

Furthermore, it should be noted that the stopper never needs to be replaced, since it always remains coupled to the bottle.

Once spill-out has been performed, it is then possible to restore full closure of the stopper with operations (cutting and heat-sealing) that are particularly simple to perform and automate.

It should also be noted that another operating difficulty that is fully eliminated is the one related to the replenishment operation, which entails significant costs in large runs.

It is also noted that any aesthetic shortcomings of the heat-sealing operation can be easily concealed by means of the conventional methods for covering the head of the stopper, without requiring other covering methods.

The present invention is susceptible of numerous modifications and variations, all of which are within the scope of the inventive concept; thus, for example, the stopper can also be associated with a cork covering.

All the details may furthermore be replaced with other technically equivalent elements.

The materials and the dimensions may be any according to the requirements.

What is claimed is:

1. A stopper for racking-off operations, said stopper comprising:

a body made of plastics and having substantially a mushroom shape, said body including a tubular element adapted to enter a neck of a bottle, and a head being monolithic with said tubular element and having a larger diameter than said tubular element, said head comprising an outer wall and an inner wall, said outer wall having a lower portion which extends radially outwardly from said tubular element, an intermediate portion which extends in a substantially vertical direction and an upper portion which extends radially inwardly toward said inner wall, said inner wall extending from said tubular element in a substantially vertical direction parallel to said intermediate portion, said inner wall defining a through duct and being spaced from said intermediate portion, said duct being connected to an internal cavity of said tubular element;

a container extending upwardly from said head opposite to said tubular element, said container having a substantially cylindrical shape, an opening adjacent said head and an end wall which delimits an inside of said container adapted for collecting sediment from a fluid in the bottle, said opening connecting said inside of said container to said internal cavity of said tubular element, and said end wall of said container being free of any protruding portions protruding from said end wall into said inside of said container and into said through duct; and a connecting portion forming a neck between said head and said container, said connecting portion having a diameter less than the diameter of said head and less than the diameter of said container.

2. Stopper according to claim 1, wherein said tubular element has an internal surface which is tapered at least proximate to said head.

3. Stopper according to claim 1, wherein said connecting portion tapers so as to form said neck.

4. Stopper according to claim 1, wherein said tubular element has an externally smooth surface.

5. Stopper according to claim 1, wherein said tubular element has an external surface that is ribbed along its circumference.

6. Stopper according to claim 1, wherein said head is associable with a covering being any of a metallic and a cork covering.

7. Stopper according to claim 1, wherein said body and said container are obtained by a single operation, said operation being any of injection and molding.

8. A racking-off process for eliminating sediment from sparkling wine in a bottle, comprising the steps of:

providing a stopper having: a body made of plastics and having substantially a mushroom shape, said body including a tubular element adapted to enter a neck of a bottle, and a head being monolithic with said tubular element and having larger diameter than said tubular element, said head comprising an outer wall and an inner wall, said outer wall having a lower portion which extends radially outwardly from said tubular element, an intermediate portion which extends in a substantially vertical direction and an upper portion which extends radially inwardly toward said inner wall, said inner wall extending from said tubular element in a substantially vertical direction parallel to said intermediate portion, said inner wall defining a through duct and being spaced from said intermediate portion, said duct being connected to an internal cavity of said tubular element; a container extending from said head opposite to said tubular element, said container having a substantially cylindrical shape, an opening adjacent said head and an end wall which delimits an inside of said container adapted for collecting sediment from a fluid in the bottle, said opening connecting said inside of said container to said internal cavity of said tubular element, said end wall of said container being free of any protruding portions protruding from said end wall into said inside of said container into said through duct; and a connecting portion forming a neck between said head and said container, said connecting portion having a diameter less than the diameter of said head and less than the diameter of said container;

filling a bottle with wine;

inserting said cylindrical element of said stopper into an opening of a neck of said bottle so as to seal the wine inside the bottle;

storing the bottle for an adequate period of storage time such that said container of said stopper is arranged downwardly with respect to said bottle;

collecting sediment at a bottom of said container while said bottle is stored during said storage time; and cutting said container from said head at said neck between said head and said container and heat-sealing said head where said container has been cut therefrom.

9. The process of claim 8 further including, after said step of collecting sediment and before said step of cutting said container and heat-sealing said head, a step of freezing wine at said neck of said bottle.

* * * * *